United States Patent [19]

Adams

[11] Patent Number: 4,717,196
[45] Date of Patent: Jan. 5, 1988

[54] PICK-UP TRUCK BED COVER
[75] Inventor: James P. Adams, Greeley, Colo.
[73] Assignee: Adelco, Inc., Greeley, Colo.
[21] Appl. No.: 884,490
[22] Filed: Jul. 11, 1986
[51] Int. Cl.[4] ............................................. B60J 7/10
[52] U.S. Cl. .................................. 296/98; 160/36; 160/201; 296/100
[58] Field of Search ................... 296/98, 100; 49/420, 49/421, 425, 426; 160/32, 36, 37, 133, 201, 202, 309, 310

[56] References Cited

U.S. PATENT DOCUMENTS

| | | | |
|---|---|---|---|
| 1,950,927 | 3/1934 | McMillan | 296/98 X |
| 2,248,538 | 7/1941 | Liebler | 296/98 |
| 2,963,856 | 12/1960 | Caddell | 160/201 X |
| 2,992,040 | 7/1961 | Groth et al. | 296/98 |
| 3,148,724 | 9/1964 | Chieger et al. | 160/201 X |
| 3,848,653 | 11/1974 | Youngs | 160/310 X |
| 4,013,113 | 3/1977 | Frei | 160/36 |
| 4,138,154 | 2/1979 | McKeon | 296/98 |
| 4,210,361 | 7/1980 | Marvin et al. | 296/100 X |
| 4,252,362 | 2/1981 | Campbell | 296/98 |
| 4,611,848 | 9/1986 | Romano | 296/98 |

Primary Examiner—Robert B. Reeves
Assistant Examiner—Russell D. Stormer
Attorney, Agent, or Firm—Bruce G. Klaas

[57] ABSTRACT

A cover system for a pick-up truck having an open top defined by vertical spaced apart side walls, and a front wall is disclosed. The cover system includes a rollable cover portion which has the capability of being either completely or partially extended or retracted to close or expose the truck bed. The cover portion will consist of a multiplicity of adjacent transverse panels which, in preferred embodiments, are continuously connected along their transverse length by hinges of flexible and water resistant material. The cover portion will be extended or retracted by a drive system located at the upper forward section of the truck bed. The drive system will include one or more drive roller intermediate the side walls of the truck bed. The drive rollers will be in driving contact with and have a surface structured to positively engage the underside of the cover panels. Controls and a motor will be provided to control and activate the drive system. A reeling system will be provided adjacent to the drive system. The cover portion will be attached to the reeling system so that movement of the reeling system will also cause the cover portion to be extended or retracted. The reeling system will be linked in a coordinated manner with the drive roller. In one embodiment, when the tailgate of the truck is removed or absent, the rear opening of the truck bed will be covered by driving the cover portion to the floor at the rear of the truck bed.

5 Claims, 7 Drawing Figures

PICK-UP TRUCK BED COVER

BACKGROUND OF THE INVENTION

1. Field of the Invention

This invention relates to new and useful improvements in the art of covering and locking the top of the bed of a land vehicle, such as a conventional pick-up truck. More particularly it relates to such a system in which there is positive interaction between a cover and a drive system for the cover. It also relates to such a system in which a reeling system, separate from the drive system, is provided which reeling system takes up and feeds the cover. It also relates to such a system in which the cover can be extended to the floor of the bed of the truck by the positive driving action between the cover and the drive system.

2. Description Of Prior Art

In the prior art, many attempts have been made at providing automated, weather and theft resistant, or load bearing vehicle covers. For example, Kirkum U.S. Pat. No. 4,518,194 discloses an automatic cover assembly for an open top pick-up truck consisting of a series of travelling rectangular frames covered with a sheet of flexible material. The frames are stored in accordion folds in a box located at the front of the truck. Motor means are provided to drive and control the movement of the frames and cover sheet in the manner of a rack and pinion drive. However, this reference does not disclose a load bearing cover in which a portion of the drive system is integrated into the structure of the cover. It also fails to disclose a cover system that is wound on a reeling system or means for extending and driving the cover to the floor of the truck bed. Thorpe U.S. Pat. No. 3,774,958 discloses a dump truck having a continuous sheet metal cover which is wound upon a motor driven cylindrical drum which is located above and forward of the truck body. There are sinusoidal guides for the lateral edges of the sheet metal in the upper side walls of the truck body. The roll is contained on the drum by a plurality of rods positioned around the drum. The cover is moved along the guides to an open or closed position by rotation of the drum on which the sheet is wound. This reference does not disclose a segmented load bearing cover in which a portion of the drive system is integrated into the structure of the cover, nor does it disclose means for extending and driving the cover to the floor of the truck bed. Additionally it does not disclose a reeling and holding device for the cover which is separate from the drive system. Lamb U.S. Pat. No. 4,563,034 discloses a retractable cover for a conventional pick-up truck which includes a pair of beaded edges, wherein each of these beaded edges is slidably engaged in a track mounted to the side walls of the truck bed. One end of the cover is attached to a spring-loaded roller, rotatably mounted to the forward section of the truck bed, and a locking mechanism is at or near the tail gate to maintain a spring bias when the cover is in an extended position. The cover system of this reference is operated and moved to a manually closed position, has no provision for a motor, and is not load bearing. The cover is retracted by the reeling action of the spring loaded roller, and is stored and held on the same spring loaded roller. There is no provision for driving the cover to the floor of the bed of the truck.

The Campbell U.S. Pat. No. 4,252,362 shows a conventional pick-up bed with a cover comprised of a double-layered sheet of material. Slats may be fastened transversely between the layers. When the cover is only a sheet it is housed on a reel. When it includes slats it is stored in a fan-fold configuration, separate from a reel. The cover is supported slidably in a multi-channel track in the side walls. This allow the rear of the cover to be moved by hand through the chosen channel to the floor of the truck bed and define a closed compartment which is less than the total cargo area. The cover is extended by hand and withdrawn using a hand lever and a rack and pawl mechanism. There is no drive system to extend the cover or to drive it to the floor of the truck bed. Penner U.S. Pat. No. 4,046,416 describes an open truck body using a flexible cover that is wound on a spring loaded transverse longitudinal roller at one end of the truck box and connected at its other end to a pair of mounting plates which are in turn attached to an endless chain journaled around front and rear sprockets on each side of the truck body. A power source is connected to the sprockets and can effect the forward or rearward movement of the chain and mounting plates that cause the cover to move between its open and closed positions. Again, this reference does not disclose a segmented, load bearing cover in which a portion of the drive system is integrated into the structure of the cover. McKeon, U.S. Pat. No. 4,138,154 discloses a semi-truck trailer for bulk loading employing an overhead door composed of a multiplicity of pivotally connected, load bearing flat panels coupled to a rotatable drum around which the door is rolled when in its open position. The door is moved to its closed position by means of a cable journaled around a pulley at the rear of the trailer and attached to a hand-crank operated cable winding drum. It is moved to the open position by using a second crank which rotates the door winding drum to withdraw and store the door. The system is hand driven, by means of a crank, but the drive system is not integrated into the structure of the cover. Cross U.S. Pat. No. 3,649,072 teaches a manually operated, load bearing cover system in which a series of tranverse interlocking slats are longitudinally moved to form a telescoped stack. The system has no drive means integrated with the cover, nor does it have means for storage on a reeling system.

SUMMARY OF THE INVENTION

It is therefore an object of this invention to provide a new and improved positively driven extendable and retractable load bearing cover portion for a pick-up truck bed.

A further object of this invention is to provide such a cover portion which, due to its flexibility and the positive nature of the drive system, can also be extended downward to the floor at the rear of the bed of the truck to replace the conventional tailgate.

Yet another object of this invention is to provide such a cover system having a reeling system which is separate from the drive system, which reeling system can also assist in taking-up and feeding the cover portion.

A further object of this invention is to provide such a reeling system which includes a combination of motor driven belts and pulleys, similar to the arrangement of a conveyor system, which conveyor system can be used as a means to hold and to feed the cover portion.

Yet another object of this invention is to provide a motor driven roller system for such a cover system, which drive roller is attached transversely within the forward upper portion of the truck bed, whereby the surface of the drive roller is in a form to positively engage the structural under surface of the cover portion in a manner to positively drive the cover portion to thereby extend or retract it between positions which cover or expose the truck bed when the drive system is activated.

An additional object of this invention is to provide such a drive roller which can interact with the cover portion to extend it to a closed position in which it is in contact with the tailgate or truck bed floor to provide a secure compartment.

These and other objects of the present invention are accomplished by the present invention, which in its preferred embodiment provides an automated, retractable, moisture resistant, load bearing cover portion for the open bed of a pick up truck. In one embodiment of the present invention provisions are made for extending the cover downward to the rear of the truck bed to close the rear opening, thus eliminating the need for a tailgate when it serves no special purpose. A reeling and holding system is also provided to roll and store the cover in its open position and to unroll and feed it rearward, when being moved to a closed position.

These objects are accomplished by the present invention which provides a cover system for a pick-up truck bed having an open top defined by a front wall and a pair of vertical spaced apart side walls, and wherein a pair of tracks are mounted longitudinally in the vicinity of the top edge of each side wall. The cover system will include a rollable, load bearing cover portion which has the capability of being either completely or partially extended or retracted to cover or expose the truck bed. The cover portion will be extended or retracted by a drive system located at the upper forward section of the truck bed. The drive system will include one or more rotatable substantially cylindrical drive rollers intermediate the side walls of the truck bed. The cover portion will be generally rectilinear in shape and consist of a multiplicity of adjacent transverse panels which, in preferred embodiments, are continuously connected along their transverse dimensions by hinges of flexible and water resistant material which will extend the full width of the cover. The hinges will also provide a channel for the natural drainage of water from the cover, and will seal out dust and dirt. The cover portion will also include a bottom surface and a pair of spaced apart side edges, which side edges will ride within and connect the cover portion to the tracks on the side walls of the truck bed. The bottom surface of the cover portion will carry first connecting means and the surface of each one or more drive roller will carry second connecting means. In operation the second connecting means of the one or more roller will be in driving contact with, and, positively engage a portion of the first connecting means on the underside of the cover portion. With this arrangement the rotation of the one or more drive rollers will cause substantially immediate and controlled longitudinal movement of the cover portion along the tracks mounted on the side walls. In preferred embodiments the first connecting means carried by the bottom surface of the cover portion will be substantially in the form of an elongated ribbed strip, while the second connecting means carried by the surface of the drive rollers will be substantially in the form of a ribbed cylinder.

In preferred embodiments controls and motor means will be provided to control and activate the drive system. A system for reeling and holding the cover portion will also be provided. The reeling system will be adjacent to, but separate from, the drive system, and will serve to feed or to take-up the cover portion as it is extended or retracted by the rotation of the one or more drive roller. In preferred embodiments, the reeling system will include a rotatable shaft located adjacent to and parallel with the drive system. Two or more pulleys will be fixed on the shaft between the side walls of the truck bed. Each pulley will carry a continuous flexible belt connected around itself and around one or more associated idler pulley. Together the pulleys, belts and idler pulleys will form a conveyor system which will serve the purpose of a cover winding hub or reel, and which will also provide a second source of movement to and for the cover portion. Such movement of the cover portion by the reeling system will be accomplished by securing the forward edge of the cover portion to each of the belts. With this arrangement the movement of the belts in the conveyor system will cause the connected cover portion to be extended or retracted. In preferred embodiments the reeling system will be linked to a motor and will be activated in a coordinated manner with the drive system. Thus, when the drive system is activated to extend the cover portion, the reeling system will be simultaneously activated in a coordinated manner to feed the cover portion so as to cover the truck bed. In a similar manner, when the drive system is activated in a coordinated manner to retract the cover portion, the reeling system will be simultaneously activated to reel and retract the cover portion so as to expose the truck bed.

In one embodiment of the present invention, when the tailgate of the truck bed is removed or absent tracks can be added to extend downward to the floor of the truck bed. Then, the rear opening of the truck bed may be covered by positively driving and extending the cover portion along the downwardly extended tracks to the floor of the truck bed. In such an operation the cover portion will be extended, guided and held in place by the downward continuation of the tracks. This extension of the cover portion downward to the floor can be accomplished in the practice of the present invention due to the positive driving action of the drive system on the cover portion, along the downward continuation of the tracks to the floor of the pick-up truck bed.

In preferred embodiments the cover panels constituting the cover portion will be substantially water impermeable, tear and cut resistant and rigid, so that when they are connected together and the cover portion is fully extended, the cover portion will be substantially impervious and load bearing, and will fully protect the pick-up truck bed from wind, rain weather, theft, and vandalism.

For a fuller understanding of the nature and objects of the present invention, reference should be made to the following detailed description taken in conjunction with the accompanying drawings.

BRIEF DESCRIPTION OF THE DRAWINGS

The accompanying drawings illustrate complete preferred embodiments of the present invention according to the best modes presently conceived for the practical application of the principles thereof, and in which.

DETAILED DESCRIPTION OF THE DRAWINGS

Figure 1:
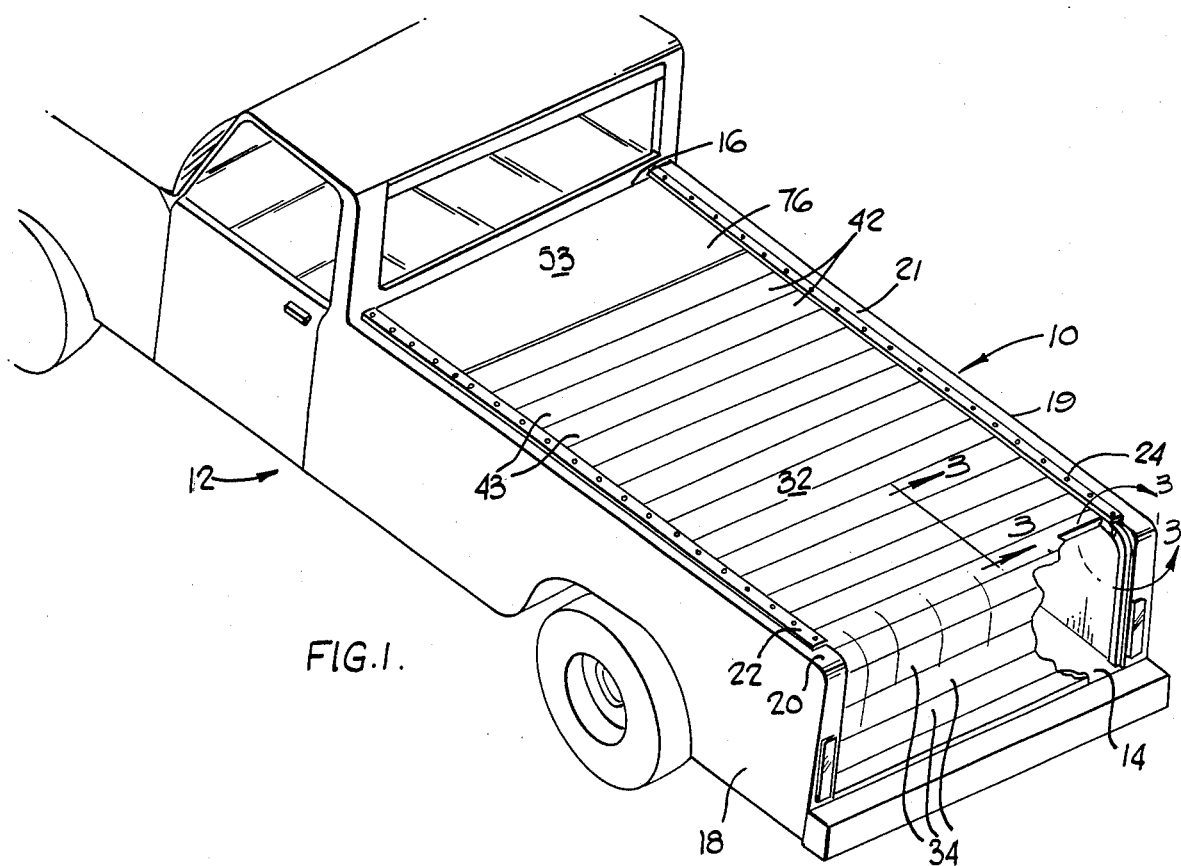
FIG. 1 is a diagrammatic, partially broken away perspective view of a first embodiment of the invention from the left rear side of a conventional pick-up truck with the tail gate removed and the cover portion of this invention fully extended in its closed position to the floor of the truck bed.

Now referring to the drawings, the present invention provides a cover system, generally 10, for a pick-up truck, generally 12, having a bed with an open top defined by floor 14, front wall 16 and a pair of vertical spaced apart side walls 18 and 20, all such walls being normal to floor 14. A pair of tracks, generally, 22 and 24 are mounted longitudinally at the top edge of side walls 18 and 20, respectively.

Figure 2:
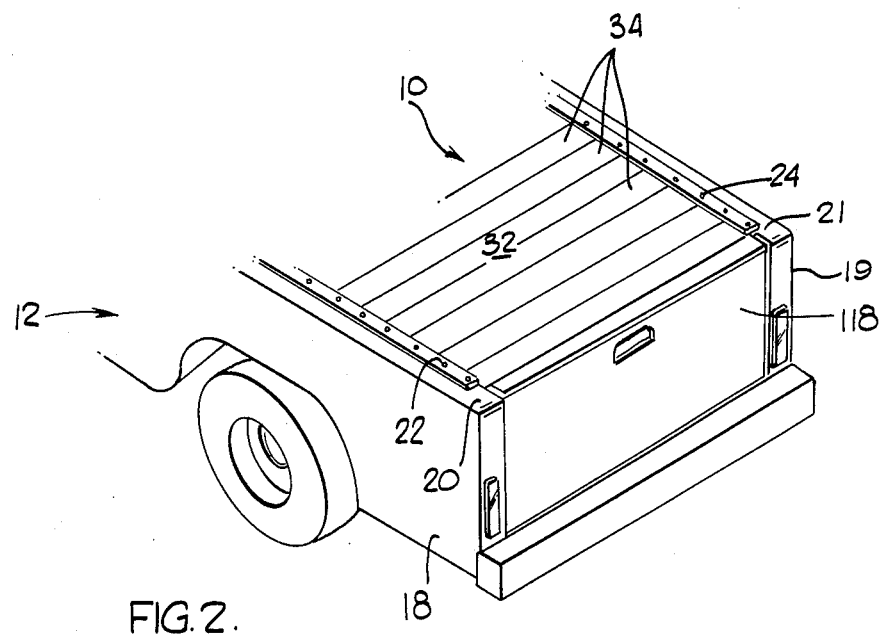
FIG. 2 diagrammatically shows a second embodiment of the invention the fragmentary left rear portion of a truck bed, with the tail gate of the truck in place and the cover portion extended in its closed position to engage the tail gate.
Figure 3:
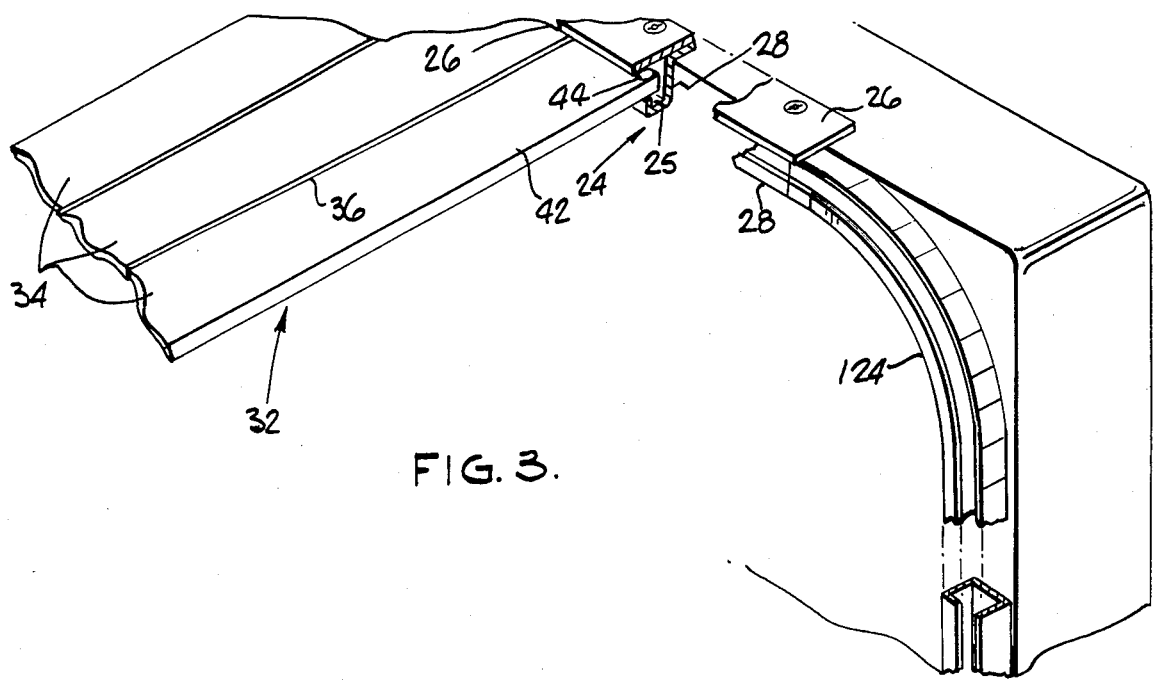
FIG. 3 is an enlarged inside rear perspective view of the truck bed taken at cutaway 3—3 of FIG. 1, showing the details of a section of one of the tracks in relation to the cover portion, and also showing the nature of the downward track extension as used when the tail gate is removed.

As shown in FIG. 3, track 24, and likewise opposed track 22, includes an open C-shaped channel 25. Channel 25 may be formed, for example, as a single piece, or which may be formed, for example, from the joinder of cap plate 26 and an S-shaped side bracket 28. Cover system 10 includes a rollable cover portion 32 which has the capability of being either completely or partially extended or retracted to cover or to expose the open top, or the open top and rear of the truck bed, as shown in FIGS. 2 and 1, respectively. Cover portion 32 is generally rectilinear in shape and consists of a plurality of adjacent transverse panels 34 which, are connected along their adjacent transverse edges by hinges 36. In preferred embodiments hinges 36 are composed of flexible and water resistant material and extend and connect the full width of adjacent panels 34. Hinges 36 also provide a channel 38 for the drainage of water from the cover, and serve to prevent dust and dirt from infiltrating through cover portion 32. Cover portion 32 is of such a transverse width that the edges 42 of each panel 34 extend into and are supported by, and slidably ride within channels 25 of tracks 22 and 24 carried on side walls 18 and 20, respectively, of truck bed 12. Weather strips 44 are secured to the top of each channel 25 and are positioned to bear against the tops of edges 42 of panels 34 to provide a dust and water seal.

Figure 4:
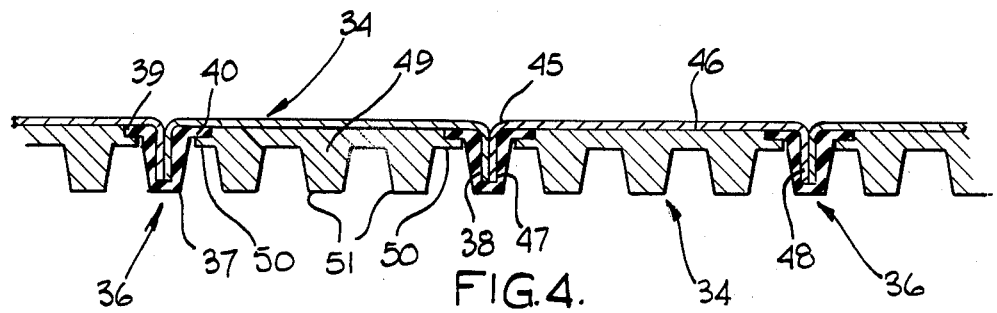
FIG. 4 is a partial cross-sectional view taken along 4—4 of FIG. 1 showing details of the cover portion, including the flexible hinge used to connect the panels of the cover portion and the details of ribbed strips bonded to the undersurface of the panels which serve to reinforce the cover panels, hold the hinges in place, and to provide a first connecting means with which the drive roller is designed to be positively engaged.

In the embodiment shown, see FIG. 4, the bottom surface of each panel 34 of cover portion 32 carries reinforcing strips 48. Reinforcing strips 48 serve several purposes. First they reinforce the strength and load bearing capacity of each panel 34, and therefore also reinforce the strength and load bearing capacity of the entire cover portion 32. Additionally, reinforcing strips 48 serve to hold hinges 36 in place and thus assist in joining adjacent panels 34. Finally, they provide a surface which is formed for positive mechanical interaction with drive system 52, as detailed below. It is noted that the bottoms of hinges 36 also provide means for positive mechanical interaction with drive system 52.

Cover portion 32 is extended or retracted longitudinally above the truck bed within channels 25 of tracks 22 and 24 by a drive system, generally 52. In preferred embodiments drive system 52 will be located at the forward portion of the truck bed. Drive system 52 includes one or more rotatable cylindrical drive roller 54 intermediate side walls 18 and 20 of the truck bed. The cylindrical surface of each drive roller 54 carries a surface which is formed for positive mechanical interaction with the undersurface of cover portion 32. Thus, the undersurface of cover portion 32, and particularly of reinforcing strips 48, can be seen as providing a first connecting means, while the surface of roller 54 can be seen as providing a second connecting means. In some embodiments the surface of drive roller 54 may be composed of a pliable material. The use of pliable material for the surface of roller 54 will provide a cushioning and noise absorbing effect, and will also allow some tolerance to mismatch in the fit between drive roller 54 and the bottom surface of cover 32.

In operation a portion of the first connecting means on the underside of cover portion 32 will be in driving contact with, and will be positively engaged by a portion of the connecting means of cylindrical drive roller 54. The portion of the underside of cover portion 32 which makes such contact with roller 54 will thus, of necessity, be in a curved configuration where it makes such contact with cylindrical roller 54. With this arrangement the rotation of drive roller 54 will cause substantially immediate and controlled longitudinal movement of cover portion 32 along tracks 22 and 24 mounted on side walls 18 and 20, respectively.

In the embodiment shown, the bottom surface of cover portion 32 will be substantially in the form of an elongated ribbed strip, while the second connecting means carried by the surface of drive roller 54 will be substantially in the form of a ribbed cylinder designed to mate with and to positively engage the bottom surface of cover portion 32. Other mating forms of first and second connecting means are possible.

Figure 5:
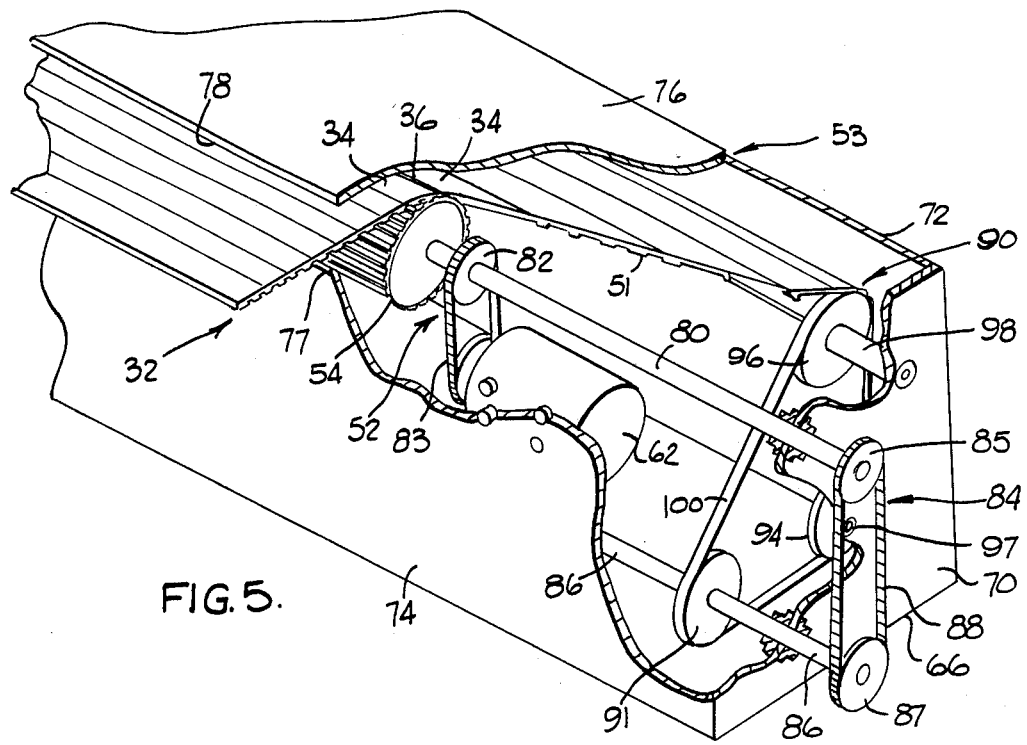
FIG. 5 is a fragmentary, partial isometric, partially broken away view of the enclosure for the drive system and the reeling and holding system.
Figure 6:
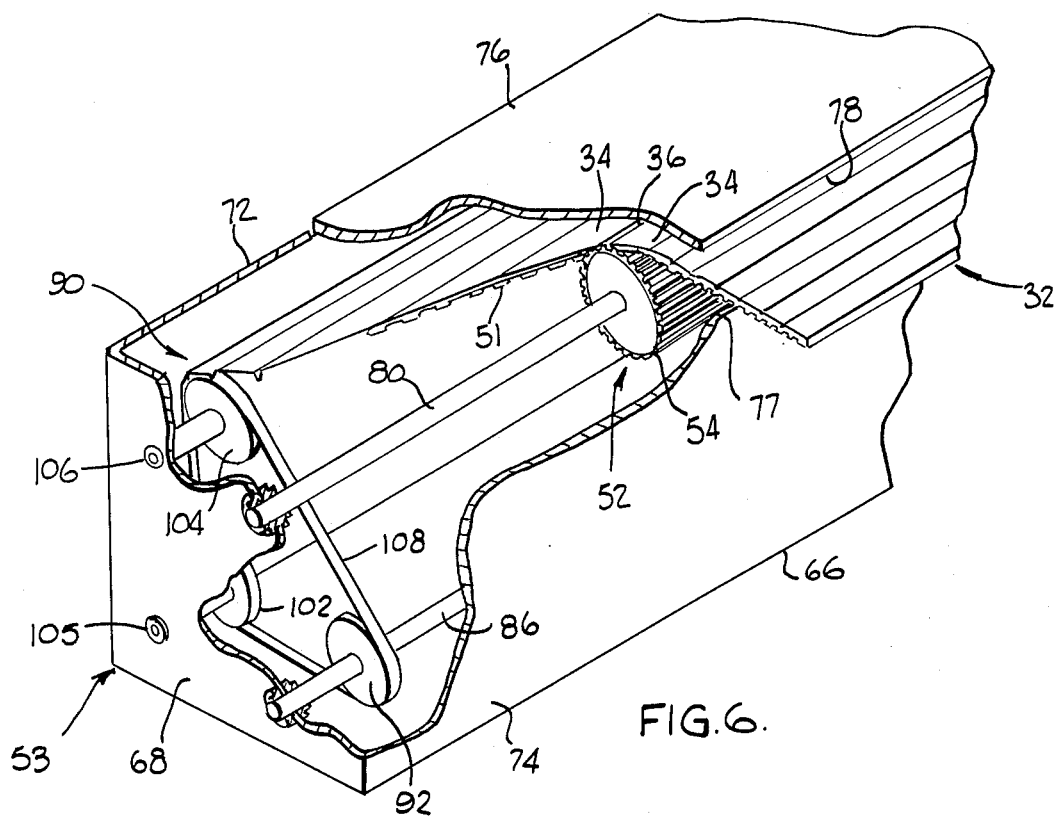
FIG. 6 is a fragmentary, partially broken away isometric view of the opposite end of the storage enclosure shown in FIG. 5.

In preferred embodiments controls, box 120, and a gear motor 62 will be provided to control and activate drive system 52. FIGS. 5 and 6 reveal additional details of drive system 52. In the embodiments shown, drive system 52 is housed in a storage unit, generally 64, consisting of a bottom plate 66, a pair of side plates 68 and 70, a back plate 72, a partial front plate 74, and an openable top plate 76. The top of partial front plate 74 does not make contact with top plate 76. Thus, cover portion 32 can enter and exit storage unit 64 through the opening which remains between partial front plate 74 and top plate 76. In preferred embodiments storage unit 64 will be located adjacent front wall 16 of the truck bed and secured to tracks 22 and 24 which are supported by side walls 18 and 20. Storage unit 64 is supported in such a manner that there are at least about four or more inches of clearance between bottom plate 66 and floor 14 of the truck bed. This clearance will allow long items to be placed on floor 14 of the truck bed and be slid forward under storage unit 64. Within storage unit 64 drive roller 54 is connected to a transverse shaft 80 which is journaled for rotation through each end of plate 68 and 70 of storage enclosure 64. Where a single drive roller 54 is used it will be substantially centered on shaft 80. Where more than one drive roller 54 is used, they will be axially aligned with one another and spaced substantially symmetrically along shaft 80 and centered between side walls 18 and 20, with their surfaces, and the space thereinbetween, effectively generating a single cylinder.

Motor 62 is mounted on front plate 74. Sprocket gear 82 is secured to shaft 80 and linked by roller chain 83 to gear motor 62. Thus, rotation of the gear portion of gear motor 62, in either direction, will be transferred by chain 83 to gear 82 on shaft 80. This will in turn cause rotation of shaft 80 and associated drive roller 54. The ribbed surface of driver roller 54 will then, in turn, engage the valleys between the ribbed undersurface of cover portion 32 to cause longitudinal movement of cover portion 32 over the truck bed to expose or to close the truck bed.

Shaft 80 is fitted at one end with a second sprocket gear 85. A second transverse shaft 84, parallel with and adjacent to shaft 80 is journaled for rotation through each end plate 68 and 70. Shaft 84 is also fitted at one end with a sprocket gear 86 which is in substantial alignment with sprocket 85. Shafts 80 and 84 are then linked together through sprockets 85 and 86 by roller chain 88. Thus, when shaft 80 is rotated shaft 84 will be caused to rotate at the same time and in the same direction.

Figure 7:
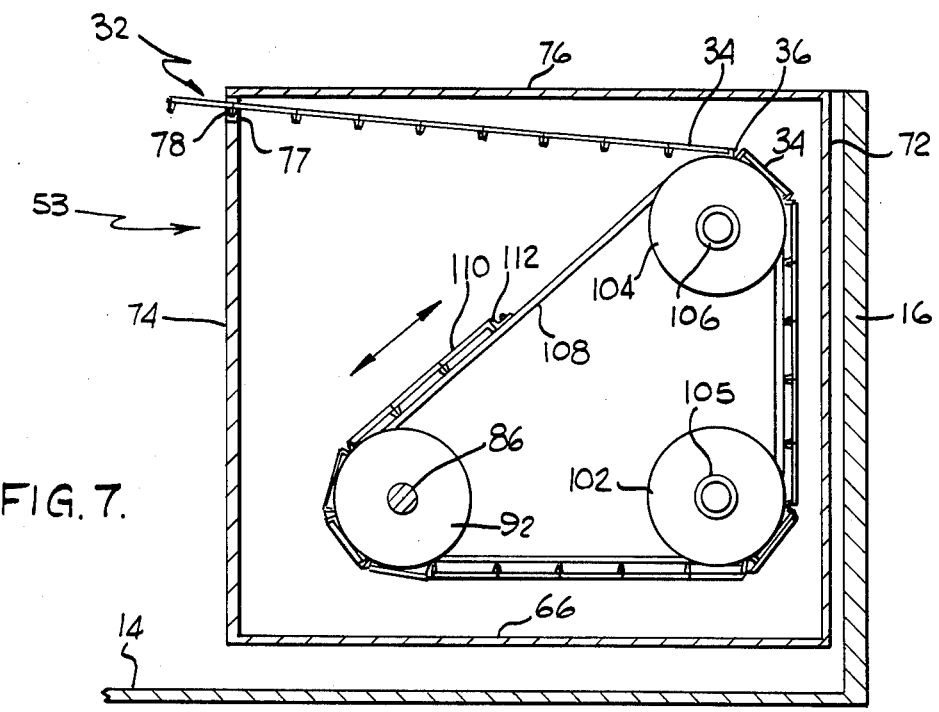
FIG. 7 is a diagrammatic side view of one side of the reeling and holding system associated with the drive system showing the manner in which the cover portion is attached to the belts and travels around the perimeter of the reeling and holding system for storage or feeding.

A system for reeling and holding the cover portion is provided in conjunction with shaft 84. The reeling and holding system is adjacent to but separate from, drive system 52, and serves to assist in feeding or taking up cover portion 32 as it is extended or retracted by the rotation of drive roller 54. In preferred embodiments the reeling system includes several items, which together form a conveyor system. This includes a pair of spaced apart pulleys 102 and 104, such pulleys fixed adjacent opposite ends of rotatable shaft 84 between side panels 68 and 70. Two idler pulleys 92 and 96 which are rotatably mounted on side panel 68 are connected to one another and to pulley 102 by endless flexible belt 106. In a similar manner, two idler pulleys 94 and 98 which are rotatably mounted on side panel 70, are connected to one another and to pulley 104 by endless flexible belt 108. Each set of pulleys 92, 96 and 102 with belt 106; and pulleys 94, 98, and 104 with belt 108 form a conveyor system at each side of the storage unit. The rotation of shaft 84 will cause the two sets of conveyor systems to move in unison as a single conveyor system, and together, as shown in FIG. 7, which serve the function of a cover winding hub or a reeling and holding system for cover portion 32 within stroage unit 64. The cover portion 32 is attached at its forward edge to each of the belts 106 and 108 by rivets 112, for example, so that rotation of shaft 84 will cause coordinated movement of belts 106 and 108 with the result that the attached cover portion 32 will be moved around the perimeter of the belts 106 and 108, as shown in FIG. 7. The conveyor system also provides a second source of movement to and for the cover portion 32, as movement of belts 106 and 108 will cause connected cover portion 32 to be extended or retracted. As shown, in preferred embodiments the reeling system will be linked to motor 62 and will be activated in a coordinated manner with drive system 52. Thus, when drive system 52 is activated to extend cover portion 32, the reeling system will be simultaneously activated to feed and extend cover portion 32 so as to cover the truck bed. In a similar manner, when drive system 52 is activated to retract cover portion 32, the reeling system will be simultaneously activated to reel and retract cover portion 32 so as to expose the truck bed. Activation and control of motor 62 will be by means of control system 120.

In one embodiment of the present invention when tail gate 118 is removed, a track extension, such as 124 shown in FIGS. 1 and 3, may be added at the rear of each track 22 and 24. The track extension, such as 124, will turn through a short radius and continue downward to floor 14 of the truck bed. Such extension of cover portion 32 downward to floor 14 can be accomplished by the present invention due to the design of the cover portion 32 which allows flexible movement around a curved track, and the positive driving action of drive roller 54 on the underside of cover portion 32. Such positive driving action provides for the driven extension of cover portion 32 along the downward continuation provided by track 124 and the downward extension of track 22 to floor 14 of the pick-up truck bed to close the opening at the rear of the truck bed in the absence of tailgate 118.

As previously noted, in preferred embodiments cover panels 34 constituting cover portion 32 will be substantially water impermeable, tear and cut resistant and rigid, and the hinges will be so hidden or inaccessible, that when the panels are connected together and cover portion 32 is fully extended it is be substantially impervious and load bearing, and will thus substantially fully protect the pick-up truck bed from wind, rain, weather, vandalism and theft. As one means of obtaining this goal, metal may be used to form the panel, or at least at the exposed top surface of each cover panel 34. This vastly increases the covers 32 protection against forced entry and against destructive elements.

In preferred operations cover 32 will be stopped at either end of its cycle by limit controls, not shown, and will also be capable of being stopped, or reversed at any intermediate open or closed position. A lock, not shown, may be provided between the rear edge of cover portion 32 and either tailgate 118 or floor 14.

The use of motors in the system eliminates the physical effort which would be required to extend or to retract the cover portion without motor means. However, by opening top plate 76 and removing or disconnecting motor 62 the system could be operated manually. In a similar manner, a separate motor could be used to drive shaft 84.

In the embodiments shown the connecting mechanism between cover portion 32 and drive roller 54 is in the form of a pair of ribbed mechanisms. However, other connecting mechanisms may be used. For example, the undersurface of cover portion 32 and the surface of drive roller 54 may be selected of materials having a sufficiently high coefficient of friction or such a surface texture that movement of drive roller 32 will result in a connection to and movement of the underside of cover portion 32. In other modified forms virtually any configuration of mating drive roller 54 and undersurface of cover portion 32 may be used.

While the invention has been particularly shown and described with reference to preferred embodiments thereof, it will be understood by those skilled in the art that the foregoing and other modifications or changes in form and details may be made therein without departing from the spirit and scope of the invention as claimed, except as precluded by the prior art.

The embodiments of the invention in which an exclusive property or privilege is claimed are defined as follows:

1. A cover system for a pickup truck bed defined by a substantially rectilinear floor having a front end, a rear end, and a pair of spaced apart side edges; a front wall extending from and substantially normal to said floor at the said front end of said floor, and a pair of substantially parallel, spaced apart side walls extending from and substantially normal to said floor at the said side edges of said floor, said side walls each having a top edge; a pair of tracks, each said track mounted longitudinally adjacent said top edge of each said side wall; and a substantially rectilinear, rollable cover means for said pickup truck bed, said cover means having a front edge, a rear edge, a bottom surface, a top surface, and a pair of spaced apart side edges, said side edges of said cover means being supported by and riding along and connecting said cover portion to said tracks, wherein the improvement includes, in combination:

a drive system for said cover means comprising an electric motor means and one or more cylindrical drum drive roller means connected to said motor means, each drive roller means having a substantially cylindrical elongated peripperal surface and being transversely mounted for rotation intermediate the side walls of the truck bed and located in inwardly spaced relationship to said tracks;

said cover means comprising a plurality of pivotally connected elongated flat rigid rectangular panel members, each of said panel members having a bottom surface and end portions slidably engageable with said tracks;

first tooth means on an intermediate central portion of each of said panel members and second tooth means on said substantially cylindrical surface of each drive roller means for continuous driving engagement therebetween at a location intermediate and between said side panel member and said tracks and for causing movement of said cover means between a retracted open position and an extended closed position relative to the truck bed, said first and second tooth means being continuously engaged to positively connect with one another, so that rotation of said drive roller means will cause immediate and controlled longitudinal movement of said cover means along the tracks mounted on the side walls;

said first toothed drive means comprising a series of ribs and grooves on said bottom surface of the panel members which are dimensioned and located so that they will positively mate with said second tooth means on said cylindrical drum drive roller means;

separate flexible hinge means extending between each adjacent pair of panel members for pivotally connecting adjacent panel members and providing a water-proof seal between adjacent panel members and extending the entire length of said panel members between the end portions thereof, whereby said cover means, when fully extended, will render the top of said pickup truck bed closed and substantially watertight;

rotatable reel means for winding and unwinding of said cover means thereon and having a non-circular peripheral surface with at least two straight line surface segments and said reel means; and reel drive means for connecting said motor means directly to said reel means for causing rotation of said reel means in synchronization with said cylindrical drum drive roller means.

2. The invention as defined in claim 1 and wherein:
   said tracks are extended from the vicinity of the top edge of the side walls downwardly substantially to the floor of the pickup truck bed whereby said cover means is capable of being driven along said extended tracks downwardly to the floor of the pickup truck bed to close the back of the pickup truck bed by the positive driving and connecting action of said drive system and said first tooth means carried by said cylindrical surface of said drive roller means and said second tooth means carried by said bottom surface of said panel members.

3. A cover system for a pickup-type truck or the like having an elongated horizontal truck bed floor portion, a pair of laterally spaced parallel vertically extending side wall portions, a front end vertical wall portion, and a rear end vertical wall portion defining a cargo space therebetween with an open top portion, the system comprising:

cover means for covering the open top portion of the truck bed and being movable from an open storage position whereat the opening is uncovered and a closed covering position whereat the opening is closed by the cover means;

said cover means comprising:
      a plurality of separate panel means having a length such as to extend transversely across the entire width of the cargo space between the side wall portions and located in side by side relationship;
      separate flexible pivotal connecting means for continuously connecting adjacent side edge portions of said separate panel portions to one another along the entire length of said panel portions;
      sealing means associated with said pivotal connecting means and the adjacent side edge portions of said separate panel means for preventing fluid flow through the space between adjacent panel means;

housing means located within said cargo space beneath said open top portion at the front end of the truck bed for holding said cover means in the open storage position;

cover drive means mounted in said housing means for driving engagement with a central intermediate portion of said cover means and moving said cover means between said open storage position and said closed covering position;

reel means in said housing means for supporting said cover means and enabling said cover means to be wound thereabout during movement from the closed covering position to the open storage position and to be unwound therefrom during movement from the open storage position to the closed covering position;

Said reel means having a non-circular peripheral support surface for said cover means including at least two straight line surface portions motor means mounted in said housing means and being operably connected to said cover drive means and said reel means for selectively causing synchronized movement of said cover means between said open storage position and said closed covering position by positively directly synchronizing driving each of said cover drive means and said reel means; and laterally spaced parallel cover guide and support track means mounted along a top portion of both of said bed side panel means for slidably guiding and supporting said cover means during movement between said open storage position and said closed covering position.

4. The invention as defined in claim 3 and wherein said cover drive means further comprising:

toothed means mounted on the lower side of at least each of said panel means for applying driving force to each of said panel means; and motor driven toothed drive means for drivable connection therebetween.

5. The invention as defined in claim 4 and wherein said toothed means extending across substantially the entire length of each of said panel means.

* * * * *